United States Patent
Kanas et al.

(10) Patent No.: US 11,068,081 B1
(45) Date of Patent: Jul. 20, 2021

(54) DIGITAL PENS FOR COMPUTING DEVICES

(71) Applicant: HEWLETT-PACKARD DEVELOPMENT COMPANY, L.P., Houston, TX (US)

(72) Inventors: Derek Kanas, Houston, TX (US); Tony Moon, Houston, TX (US); Chan Park, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 583 days.

(21) Appl. No.: 16/076,234

(22) PCT Filed: Mar. 23, 2017

(86) PCT No.: PCT/US2017/023780
§ 371 (c)(1),
(2) Date: Aug. 7, 2018

(87) PCT Pub. No.: WO2018/174885
PCT Pub. Date: Sep. 27, 2018

(51) Int. Cl.
*G06F 3/0354* (2013.01)
*G06F 1/16* (2006.01)

(52) U.S. Cl.
CPC ........ *G06F 3/03545* (2013.01); *G06F 1/1607* (2013.01); *G06F 2200/1632* (2013.01)

(58) Field of Classification Search
CPC ......... G06F 3/03545; G06F 2200/1632; G06F 1/1607; G06F 3/0386; G06F 3/04162
See application file for complete search history.

(56) References Cited

U.S. PATENT DOCUMENTS

| 5,180,891 A | 1/1993 | Trumbo |
| 6,450,721 B1 | 9/2002 | Amico et al. |
| 8,199,130 B2 | 6/2012 | Tang et al. |

(Continued)

FOREIGN PATENT DOCUMENTS

| WO | 2006113423 A2 | 10/2006 |
| WO | 2015079347 A1 | 6/2015 |

OTHER PUBLICATIONS

Limer, "A Look Inside the Clever Mechanism That Makes Microsoft's Surface Book So Cool", Retrieved from Internet: http://www.popularmechanics.com/technology/gadgets/a18050/ifixit-teardown-shows-surface-book-mechanism/, Nov. 3, 2015, 8 pages.

(Continued)

*Primary Examiner* — Abbas I Abdulselam
(74) *Attorney, Agent, or Firm* — HPI Patent Department

(57) ABSTRACT

Examples disclosed herein provide a digital pen for a computing device. As an example, the digital pen includes a barrel and a clip coupled to the barrel via a spring, wherein the clip is movable within the barrel in a direction opposite a force provided by the spring. The digital pen includes a first set of magnetic members to magnetically couple with a second set of magnetic members of the computing device, when the first and second sets of magnetic members are brought within proximity of each other. The digital pen includes a lever arm disposed within the barrel and comprising a wedge along an end of the lever arm. As an example, the wedge is to frictionally engage a retractable part of the computing device and an interior panel of the barrel, when the first and second sets of magnetic members are to magnetically couple with each other.

15 Claims, 3 Drawing Sheets

(56) References Cited

U.S. PATENT DOCUMENTS

| | | |
|---|---|---|
| 9,025,318 B2 | 5/2015 | Ashcraft et al. |
| 9,268,379 B2 | 2/2016 | Ashcraft et al. |
| 9,335,791 B2 | 5/2016 | Fontana et al. |
| 9,507,381 B1 | 11/2016 | Vanderet et al. |
| 2003/0128193 A1 | 7/2003 | Huang et al. |
| 2004/0100457 A1 | 5/2004 | Mandle |
| 2007/0268278 A1* | 11/2007 | Paratore .............. G06F 3/03545 345/179 |
| 2010/0021022 A1 | 1/2010 | Pittel et al. |
| 2013/0229386 A1 | 9/2013 | Bathiche et al. |
| 2013/0335903 A1 | 12/2013 | Raken et al. |
| 2014/0071100 A1 | 3/2014 | Becerra et al. |
| 2018/0059817 A1* | 3/2018 | Pirie ..................... G06F 1/1626 |
| 2018/0224954 A1* | 8/2018 | Chiang ............... G06F 3/03545 |

OTHER PUBLICATIONS

Brown, "Toshiba Portege Z10t Review: The Best Detachable So Far (If You're Into That Sort of Thing)", Retrieved from Internet: http://www.pcworld.com/article/2148305/toshiba-portege-z10t-review-the-best-detachable-so-far-if-you-re-into-that-sort-of-thing.html, Apr. 30, 2014, 6 pages.

\* cited by examiner

DIGITAL PENS FOR COMPUTING DEVICES

BACKGROUND

The emergence and popularity of mobile computing has made portable computing devices, due to their compact design and light weight, a staple in today's marketplace. Computing devices, such as notebook computers and tablet computers, generally include a display member that is utilized to provide a viewable display to a user. The viewable display may be a touchscreen, allowing the user to interact directly with what is displayed by touching the screen with simple or multi-touch gestures.

DETAILED DESCRIPTION

As an example, an input device, such as a digital pen, may be used with a computing device, such as a tablet computer, to capture handwriting or brush strokes of a user. The tablet computer may convert handwritten analog information, provided by the digital pen, into digital data, enabling the data to be utilized in various applications on the tablet computer.

Examples disclosed herein provide a system for securing a digital pen to a computing device, for easy accessibility and also for secure storage when not in use. The system for securing the digital pen to the computing device provides minimal impact to the exterior design of both the digital pen and computing device, while at the same time providing a strong attachment of the digital pen to the computing device while secured, in order to reduce any inadvertent disconnection or loss of the digital pen. The ability provided to easily access the digital pen allows a user to make use of the digital pen with minimal effort.

Figure 1A:
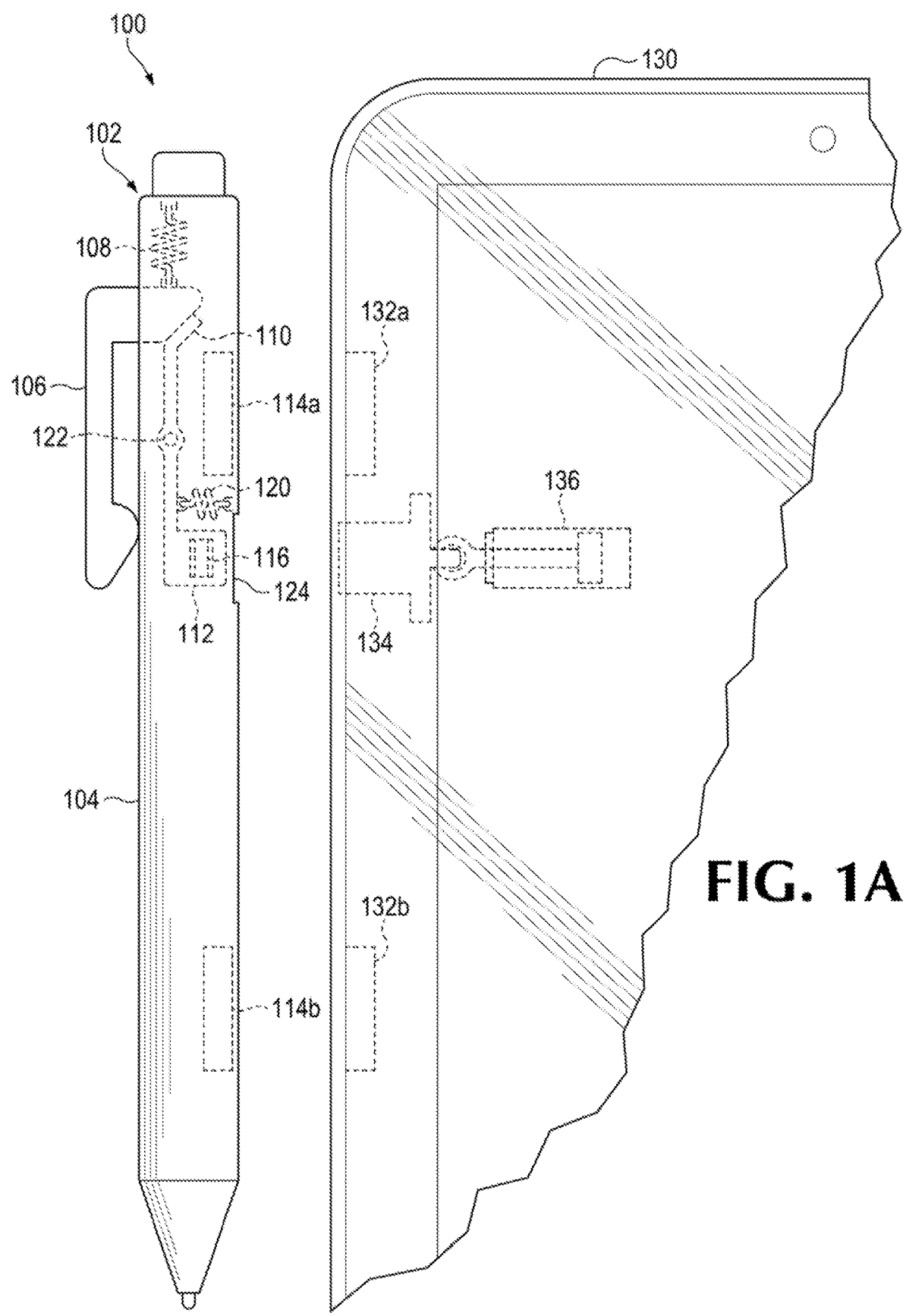
FIG. 1A illustrates a system including a digital pen and a computing device, according to an example.

With reference to the figures, FIG. 1A illustrates a system 100 including a digital pen 102 and a computing device 130, that provides a mechanism for securing the digital pen 102 to the computing device 130, and making the digital pen 102 easily accessible when required, according to an example. As will be further described, the mechanism may include structures in both the digital pen 102 and the computing device 130, for coupling or docking the digital pen 102 and the computing device 130 together.

As an example, the digital pen 102 includes a barrel 104 and a clip 106 coupled to the barrel 104. As will be further described, movement of the clip 106 along an axis of the barrel 104 in a first direction may initiate coupling or docking of the digital pen 102 to the computing device 130, and movement of the clip in a second direction opposite from the first direction may initiate release of the digital pen 102 from the computing device 130. As mentioned above, the mechanism for securing the digital pen 102 to and releasing the digital pen 102 from computing device 130 may include structures in both the digital pen 102 and the computing device 130.

With regards to the digital pen 102, structures include a lever arm 110 disposed within the barrel 104 and a first set of magnetic members 114a-b. The lever arm 110 may include, along a first end, a wedge 112 that includes a roller 116 for interfacing with the structure in the computing device 130 (e.g., retractable part 134) via an opening 124 of the digital pen 102, as will be further described. Along a second end of the lever arm 110, opposite from the first end, the dip 106 makes contact with the lever arm 110, as illustrated. Movement of the clip 106, as described above, pivots the lever arm 110 along a pivot point 122 to either initiate coupling or release of the digital pen 102. As an example, the clip 106 may be coupled to the barrel 104 via a first spring 108, and the lever arm 110 may be coupled to the barrel 104 via a second spring 120, to provide opposing forces, as will be further described.

With regards to the computing device 130, structures include the retractable part 134, an actuator 136 for initiating retraction and extension of the retractable part 134, and a second set of magnetic members 132a-b that is used for coupling with the first set of magnetic members 114a-b of the digital pen 102, as will be further described. As an example, the actuator 136 may be used to extend the retractable part 134 when the digital pen 102 is secured to the computing device 130, and to retract the retractable part 134 when, for example, the digital pen 102 is being used. As a result, there is minimal impact to the exterior design of the computing device 130, as the retractable part 134 only protrudes from the computing device 130 when the digital pen 102 is secured to the computing device 130.

Actuation of the retractable part 136 may be manual or automatic. For example, the retractable part 134 may be spring loaded, and the user may release the retractable part 134 from the computing device 130 via a push release mechanism when desiring to secure the digital pen 102 to the computing device 130. Similarly, the user may push the retractable part 134 back into the computing device 130 upon releasing the digital pen 102 from the computing device 130. As an example of automatic actuation, if the digital pen 102 is outside of a certain range from computing device 130 (e.g., outside Bluetooth range), the actuator 136 may automatically retract the retractable part 134 within the computing device 130. Similarly, once the digital pen 102 is back within a specified range of the computing device 130 (e.g., within Bluetooth range), the actuator may automatically extend the retractable part 134 from the computing device 130. As an example, this range may be adjustable, in order to control the actuation when the user is likely to secure the digital pen 102 to the computing device 130 (e.g., when the digital pen is approaching the side of the computing device 130 where the retractable part 134 is located, and not when the user is using the digital pen 102 on a display surface of the computing device 130).

Figure 1B:
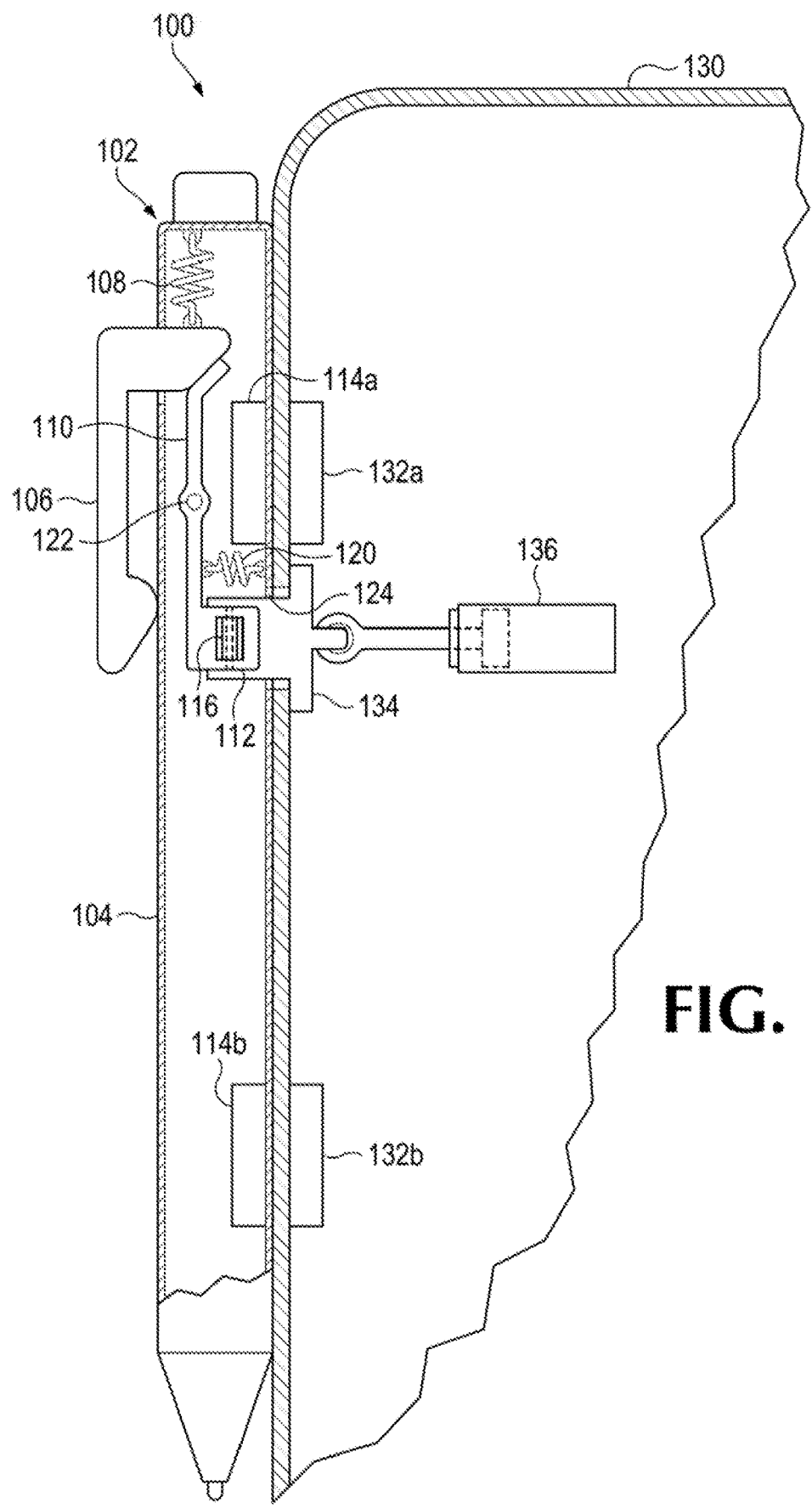
FIGS. 1B-C illustrate views of the system, when the digital pen is secured to the computing device, according to an example.
Figure 1C:
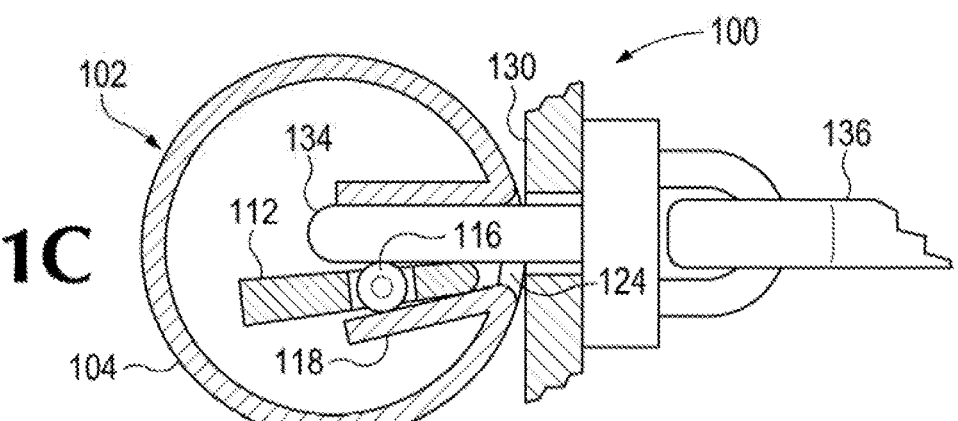

FIGS. 1B-C illustrate a front view and top view, respectively, of the system 100, when the digital pen 102 is secured to the computing device 130, according to an example. As illustrated in FIG. 1B, the retractable part 134 is extended from the computing device 130, in order to engage the wedge 112 via the opening 124 of the digital pen 102. As described above, extension of the retractable part 134 from the computing device 130 may be automated or manually initiated. As an example, the retractable part 134 automatically extends from the computing device 130 when the first set of magnetic members 114a-b from the digital pen 102 is brought within proximity of the second set of magnetic members 132a-b from the computing device 130. Although two magnets are illustrated in each set, the number of magnets may vary from what is illustrated.

As an example, when it is desirable to secure the digital pen 102 to the computing device 130, the first and second sets of magnetic members 114a-b, 132a-b may assure proper alignment and positioning of the digital pen 102 with respect to the computing device 130. As a result, when bringing the digital pen 102 within proximity of the side of the computing device 130 where the retractable part 134 extends, the digital pen 102 attaches to the computing device 130 in a desired and repeatable manner, such that they are consistently in a pre-determined position relative to one another.

Properties of the magnetic members that may be controlled include, but are not limited to, field strength and magnetic polarity. With regards to field strength, when detaching the digital pen 102 from the computing device 130, for example, after removing the frictional engagement between the wedge 112 and the retractable part 134, as will be described further below, the releasing force required to overcome the magnetic coupling between the magnetic members may be determined by controlling the field strength of the magnetic members.

With regards to magnetic polarity, magnetic elements having the same polarity (e.g., N-N or S-S) may generate a negative or repulsive magnetic force, whereas those corresponding magnetic elements having opposite polarities (e.g., N-S) will generate a positive or attractive magnetic force. Referring to FIG. 1B, a north pole of the magnetic member 114a of the digital pen 102 may generate a positive or attractive magnetic force with a south pole of the magnetic member 132a of the computing device 130. Similarly, a south pole of the magnetic member 114b of the digital pen 102 may generate a positive or attractive magnetic force with a north pole of the magnetic member 132b of the computing device 130. This positive or attractive magnetic force may be generated when the digital pen 102 is placed within proximity of the computing device 130. As a result of controlling the magnetic polarities of the magnetic members, the digital pen 102 may only attach to the computing device 130 in a specific orientation. For example, it may not be desirable to attach the digital pen 102 to the computing device 130 in an orientation that is reversed from what is illustrated in FIG. 1*l* (e.g., 114a to 132b and 114b to 132a). Therefore, any attempt made to attach the digital pen 102 and computing device 130 in a reverse orientation may generate a repulsive magnetic force rather than an attractive magnetic force.

Upon the second set of magnetic members 132a-b of the computing device 130 magnetically coupling with the first set of magnetic members 114a-b of the digital pen 102, the retractable part 134 of the computing device 130 may engage with the wedge 112 via the opening 124 of the digital pen 102. Referring to the top view illustrated in FIG. 1C, the wedge 112 may frictionally engage the retractable part 134 of the computing device 130 and an interior panel 118 of the digital pen 102. In addition, the wedge 112 may include a roller 116, as mentioned above, in order to increase the frictional engagement between the digital pen 102 and the computing device 130. The frictional engagement provided by the wedge 112 and the roller 116, alone or in combination, essentially locks the digital pen 102 on the computing device 130, providing a strong attachment of the digital pen 102 to the computing device 130, in order to reduce any inadvertent disconnection (e.g., digital pen 102 hit by something when carrying the computing device 130) or loss of the digital pen.

Figure 2A:
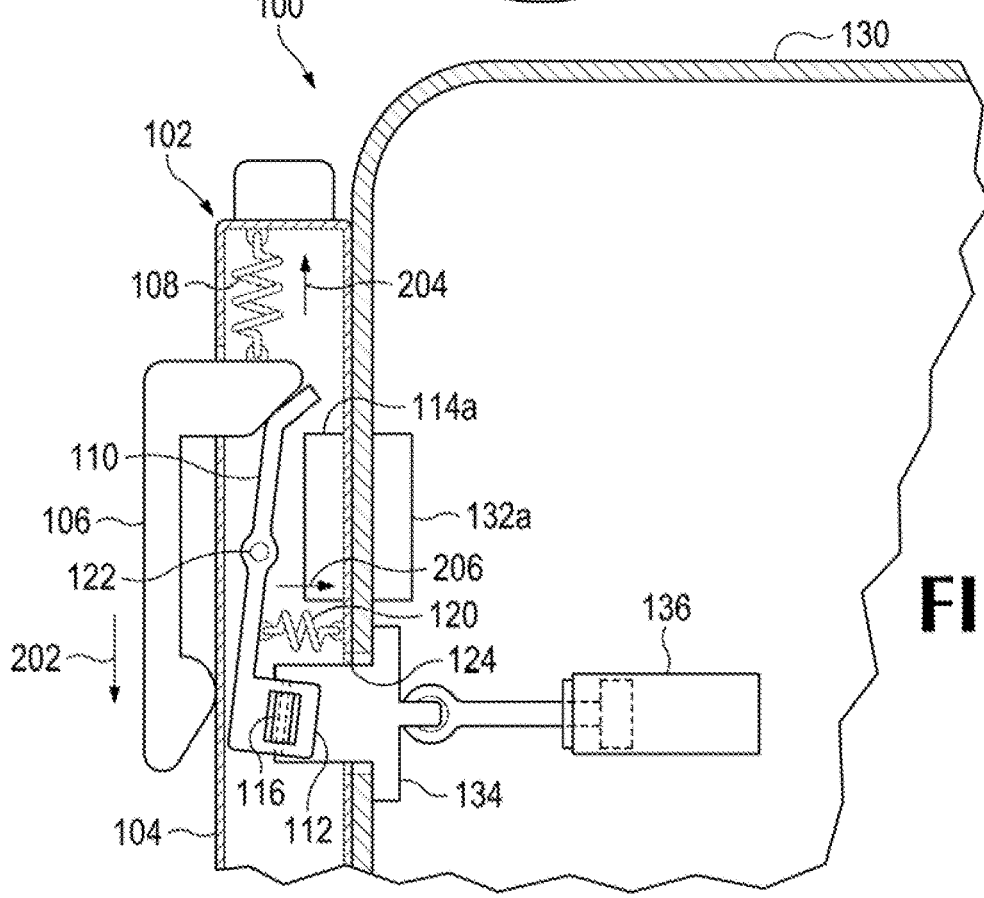
FIGS. 2A-B illustrate views of the system when the digital pen is being removed from computing device, according to an example.
Figure 2B:
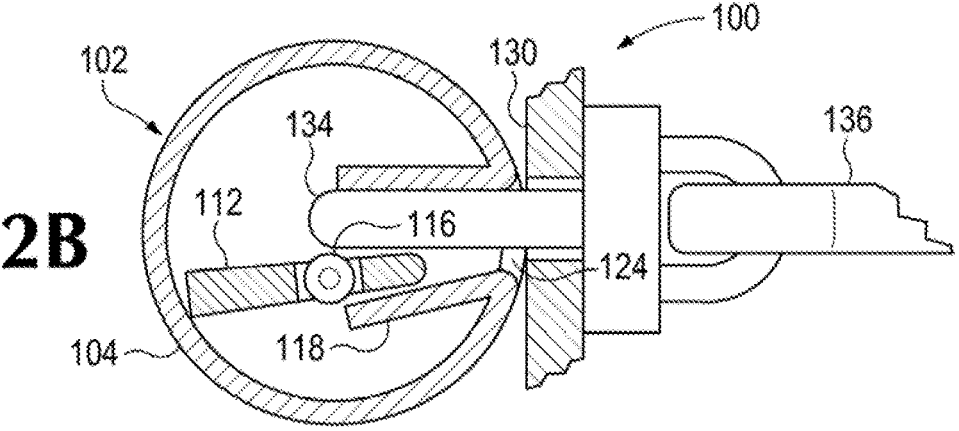

FIGS. 2A-B illustrate views of the system 100 when the digital pen 102 is being removed from computing device 130, according to an example. As illustrated, pushing on the clip 106 of the digital pen 102 (illustrated by arrow 202) retracts the wedge 112 of the digital pen 102 from the frictional engagement with the retractable part 134 of the computing device 130, providing the ability for a user to remove the digital pen 102 from the computing device 130 with minimal effort. Upon release of the digital pen 102 from the computing device 130, the retractable part 134 may be manually or automatically retracted within the computing device 130, as described above, for minimal impact to the exterior design of the computing device 130.

Referring to FIG. 2A, the clip 106 is movable within the barrel in a direction 202 opposite a force 204 provided by the first spring 108. As mentioned above, this movement may be along an axis of the barrel 104. As the clip 106 is moved in the direction 202, the clip 106 pivots the lever arm 110 along the pivot point 122, removing the frictional engagement the wedge 112 between the retractable part 134 of the computing device 130 and the interior panel 118 of the digital pen 102, as illustrated in FIG. 2B. Once the frictional engagement is removed, an opposing force provided by the user, that is greater than the magnetic coupling between the first and second sets of magnetic members 114a-b, 132a-b, is to undock the digital pen 102 from the computing device 130. As an example, the releasing force, or opposing force provided by the user, may be determined by controlling the field strength of the magnetic members. Once the clip 106 is released from the direction 202 opposite the force 204 provided by the first spring 108, the force 204 provided by the first spring 108 restores the clip to its original location, as illustrated in FIGS. 1A-B. Similarly, the opposing force 206 provided by the second spring 120 pivots the lever arm 110 back to a position for later engagement of the digital pen 102 back to the computing device 130.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:
1. A system comprising:
   a digital pen comprising:
      a barrel;

a clip coupled to the barrel via a first spring, wherein the clip is movable within the barrel in a direction opposite a force provided by the first spring;

a lever arm disposed within the barrel and comprising a wedge along a first end of the lever arm, wherein the clip is to pivot the lever arm when the clip is to be moved in the direction opposite the force provided by the first spring; and a first set of magnetic members; and a computing device comprising:

a second set of magnetic members to magnetically couple with the first set of magnetic members of the digital pen, when the first and second sets of magnetic members are to be brought within proximity of each other; and a retractable part to engage the wedge when the first and second sets of magnetic members are to magnetically couple with each other.

2. The system of claim 1, wherein when the first and second sets of magnetic members are to magnetically couple with each other, the wedge is to frictionally engage the retractable part and an interior panel of the barrel of the digital pen.

3. The system of claim 2, wherein the wedge comprises a roller to increase the frictional engagement between the digital pen and the computing device, when the first and second sets of magnetic members are to magnetically couple with each other.

4. The system of claim 2, wherein when the clip is to pivot the lever arm, the frictional engagement of the wedge, between the retractable part and the interior panel of the barrel of the digital pen, is removed.

5. The system of claim 4, wherein once the frictional engagement is removed, an opposing force provided by a user that is greater than the magnetic coupling between the first and second sets of magnetic members is to undock the digital pen from the computing device.

6. The system of claim 5, wherein the lever arm is coupled to the barrel by a second spring, wherein when the clip is to be released from the direction opposite the force provided by the first spring, a force provided by the second spring is to pivot the lever arm back to a position for later engagement of the digital pen back to the computing device.

7. The system of claim 1, wherein the clip is to make contact with a second end of the lever arm opposite from the first end of the lever arm.

8. The system of claim 1, wherein the retractable part automatically extends when the digital pen is within range of the computing device, for docking the digital pen to the computing device.

9. A digital pen for a computing device, the digital pen comprising:

a barrel;

a clip coupled to the barrel via a first spring, wherein the clip is movable within the barrel in a direction opposite a force provided by the first spring;

a first set of magnetic members to magnetically couple with a second set of magnetic members of the computing device, when the first and second sets of magnetic members are to be brought within proximity of each other; and a lever arm disposed within the barrel and comprising a wedge along a first end of the lever arm, wherein the wedge is to frictionally engage a retractable part of the computing device and an interior panel of the barrel, when the first and second sets of magnetic members are to magnetically couple with each other.

10. The digital pen of claim 9, wherein the clip is to make contact with a second end of the lever arm opposite from the first end of the lever arm, and wherein the clip is to pivot the lever arm when the clip is to be moved in the direction opposite the force provided by the first spring.

11. The digital pen of claim 10, wherein when the clip is to pivot the lever arm, the frictional engagement of the wedge, between the retractable part and the interior panel of the barrel of the digital pen, is removed.

12. The digital pen of claim 9, wherein the lever arm is coupled to the barrel by a second spring, wherein when the clip is to be released from the direction opposite the force provided by the first spring, a force provided by the second spring is to pivot the lever arm back to a position for engagement of the digital pen to the computing device.

13. The digital pen of claim 9, wherein the wedge comprises a roller to increase the frictional engagement between the digital pen and the computing device, when the first and second sets of magnetic members are to magnetically couple with each other.

14. A digital pen for a computing device, the digital pen comprising:

a barrel;

a clip coupled to the barrel via a first spring, wherein the clip is movable within the barrel in a direction opposite a force provided by the first spring;

a first set of magnetic members to magnetically couple with a second set of magnetic members of the computing device, when the first and second sets of magnetic members are to be brought within proximity of each other;

a lever arm disposed within the barrel, wherein the clip is to pivot the lever arm when the clip is to be moved in the direction opposite the force provided by the first spring; and a wedge along a first end of the lever arm, wherein the wedge comprises a roller to frictionally engage a retractable part of the computing device and an interior panel of the barrel, when the first and second sets of magnetic members are to magnetically couple with each other.

15. The digital pen of claim 14, wherein the lever arm is coupled to the barrel by a second spring, wherein when the clip is to be released from the direction opposite the force provided by the first spring, a force provided by the second spring is to pivot the lever arm back to a position for engagement of the digital pen to the computing device.

* * * * *